United States Patent
Saku

(10) Patent No.: US 6,357,806 B1
(45) Date of Patent: Mar. 19, 2002

(54) DOOR LATCH DEVICE

(75) Inventor: Fumiaki Saku, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/430,170

(22) Filed: Oct. 29, 1999

(30) Foreign Application Priority Data

Nov. 13, 1998 (JP) .......................................... 10-008990

(51) Int. Cl.$^7$ ................................................ E05C 1/06
(52) U.S. Cl. ...................... 292/182; 292/177; 292/140; 292/34; 292/36; 292/42; 70/432
(58) Field of Search ................................ 292/182, 177, 292/140, 34, 36, 42; 70/432

(56) References Cited

U.S. PATENT DOCUMENTS

| | | | | |
|---|---|---|---|---|
| 390,205 A | * | 10/1888 | Cocks ........................ | 292/36 |
| 777,408 A | * | 12/1904 | Fletcher ..................... | 292/182 |
| 1,272,710 A | * | 7/1918 | Ramsher .................... | 292/335 |
| 1,552,690 A | * | 9/1925 | Frantz ....................... | 292/33 |
| 2,034,570 A | * | 3/1936 | Flavin ....................... | 292/65 |
| 2,272,909 A | * | 2/1942 | Fantl .......................... | 40/460 |
| 2,337,948 A | * | 12/1943 | Vani ........................... | 16/237 |
| 2,565,669 A | * | 8/1951 | Smith ........................ | 116/290 |
| 2,584,088 A | * | 1/1952 | Floyd ......................... | 292/34 |
| 2,729,089 A | * | 1/1956 | Pelcin ........................ | 292/36 |
| 2,735,706 A | * | 2/1956 | Pelcin ........................ | 292/34 |
| 2,825,219 A | * | 3/1958 | Marzillier .................. | 70/488 |
| 3,304,756 A | * | 2/1967 | Eads .......................... | 70/432 |
| 3,333,878 A | * | 8/1967 | Pelcin ........................ | 292/37 |
| 3,582,119 A | * | 6/1971 | Woodworth ................ | 292/27 |
| 3,889,421 A | * | 6/1975 | Ahonen ...................... | 49/395 |
| 4,099,753 A | * | 7/1978 | Gwozdz et al. ............. | 292/177 |
| 4,490,999 A | * | 1/1985 | Castle et al. ................ | 70/432 |
| 4,892,338 A | * | 1/1990 | Weinerman et al. ........ | 292/35 |
| 5,235,833 A | * | 8/1993 | Pinto .......................... | 70/471 |
| 5,290,077 A | * | 3/1994 | Fleming ..................... | 292/35 |
| 5,570,913 A | * | 11/1996 | Puric .......................... | 292/36 |
| 5,595,076 A | * | 1/1997 | Weinerman et al. ........ | 70/208 |
| 6,007,114 A | * | 12/1999 | Hötzl .......................... | 292/34 |
| 6,089,625 A | * | 7/2000 | Prevot et al. ............... | 292/182 |

* cited by examiner

Primary Examiner—B. Dayoan
Assistant Examiner—Carlos Lugo
(74) Attorney, Agent, or Firm—Armstrong, Westerman & Hattori, LLP

(57) ABSTRACT

An in-flight meal server 1 comprises a door 20 supported by a hinge 22 at the opening of a box-shaped main body 10. A main latch device 100 for locking the door 20 to the main body 10 has a handle 110, and when the handle 110 is pulled up, a lever 120 rises and pulls out the bolt from a catch in the main body side. The plural bolts may be operated through a link mechanism connected to the lever 120, but the bolt of an auxiliary latch device 150 may also be locked by operating a knob 180 manually. When the link mechanism fails, the door is locked manually.

3 Claims, 5 Drawing Sheets

DOOR LATCH DEVICE

BACKGROUND OF THE INVENTION

1. Field of the Invention

The present invention relates to a latch device to be equipped in a door of an in-flight meal server (service cart) of an airplane and the like.

2. Description of the Prior Art

FIG. 1 is a schematic view showing the outline of the in-flight meal server.

The in-flight meal server shown as a whole by the reference number 1 has a box-shaped body 10, and the body 10 is supported by a caster 12. A door 20 is fixed to the front and back of the body 10 by a hinge 22 so that it may be opened and closed.

The door 20 may be locked to and unlocked from the body 10 by a latch device 30.

FIG. 6 is an explanatory view of the door 20 equipped with a conventional latch device.

A latch device 30 has a handle 31. The handle 31 is fixed so that it may be rotated to the direction moving away from the door through an axis portion 32 on its upper portion. The handle 31 is connected to a lever 36, and the lever 36 is supported rotatably by a pin 34.

When the handle 31 is pulled toward a user, the lever 36 connected to the handle 31 rotates to the arrow A direction with the pin 34 at the center of rotation.

A lever 36 is connected to three bolts 41, 42 and 43 through link rods 45, 46 and 47.

The three bolts 41, 42 and 43 each fit into a catch formed on the body 10 side when protruded, thereby locking the door. When the lever 36 is rotated to the arrow A direction, each link rod pulls in the respective bolt to the door so that the bolt is separated from the catch, and the door is unlocked.

SUMMARY OF THE INVENTION

The in-flight meal server is kept at an appropriate position in the galley of the airplane before and after the meal service. At this position, the door is maintained at a locked state by independent primary and secondary devices. Each one of the independent devices is required to satisfy the strength requirement under a predetermined load.

However, in the prior latch device shown in FIG. 6, the lever 36 and each bolts 41, 42 and 43 were directly connected to each other through the link rod, so they were regarded as an independent primary device. Accordingly, a turn retainer positioned in the galley of the airplane was the only secondary device, so there were cases where it was difficult for each of the devices alone to satisfy the strength requirement under the predetermined load.

The present invention provides a latch device solving the problems mentioned above.

The door latch device of the present invention is equipped with a main latch device as the primary device positioned near the handle for operating the latch, and an auxiliary latch device as the secondary device which is connected to the main latch device through a link mechanism. The auxiliary latch device is equipped with an operating portion formed on the surface of the door, a cylinder-shaped body fixed to the interior of the door, a slider inserted slidably to the body, a bolt formed integrally with the slider, a spring biasing the slider to the unlocking direction, and a knob for manually operating the slider so as to secure its independence.

Therefore, by the combination of the turn retainer positioned in the galley of an airplane and the auxiliary latch device as the secondary device, each of the independent devices alone satisfies the strength requirement under the predetermined load.

Further, the operating portion is equipped with a guide groove for guiding the knob, and a lock groove for maintaining the knob in a locked position, as well as a colored plate formed on both sides of the knob for indicating the locked or unlocked state through the guide groove to the exterior.

PREFERRED EMBODIMENT OF THE INVENTION

Figure 1:
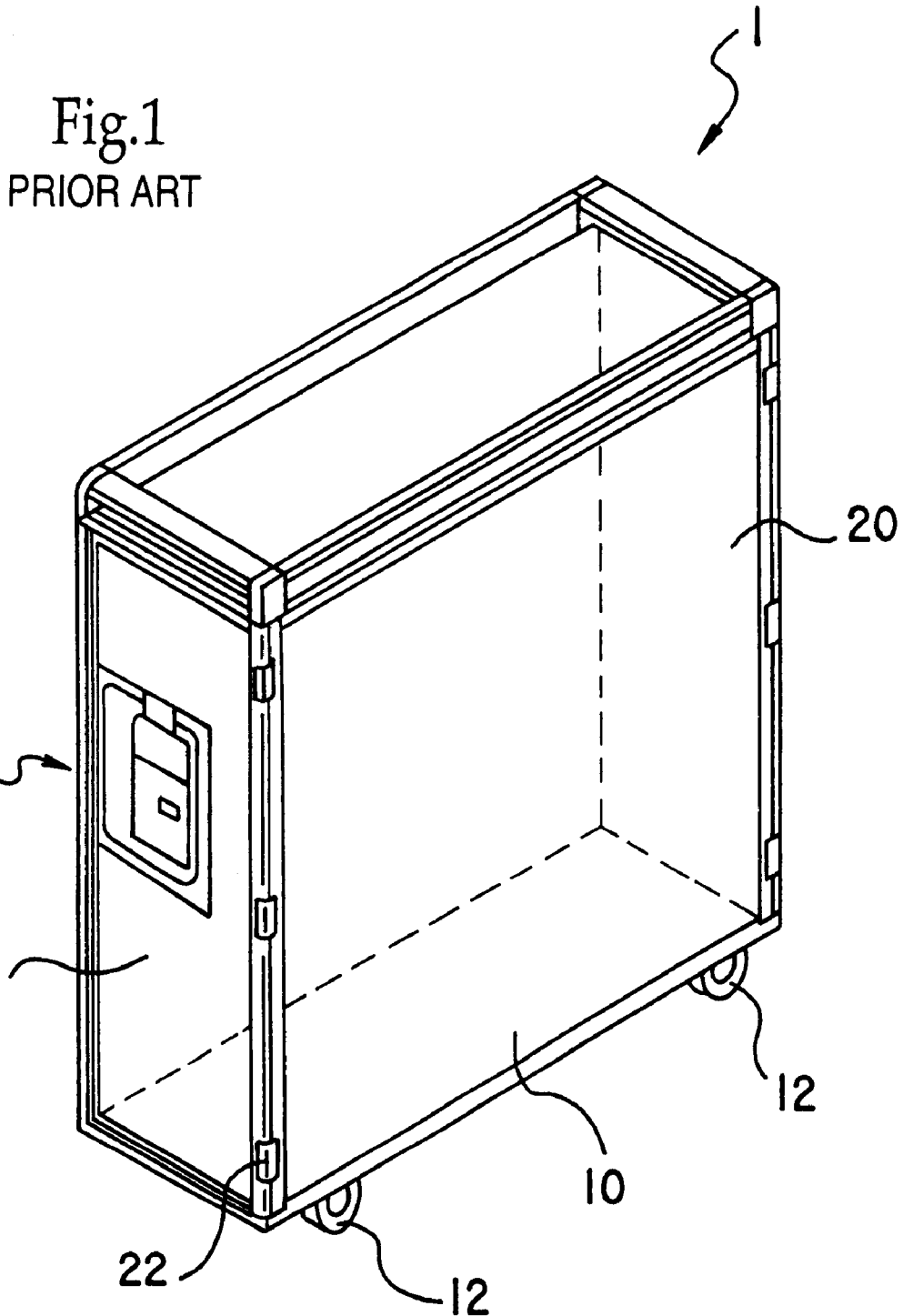
FIG. 1 is a schematic view of the in-flight meal server.
Figure 2:
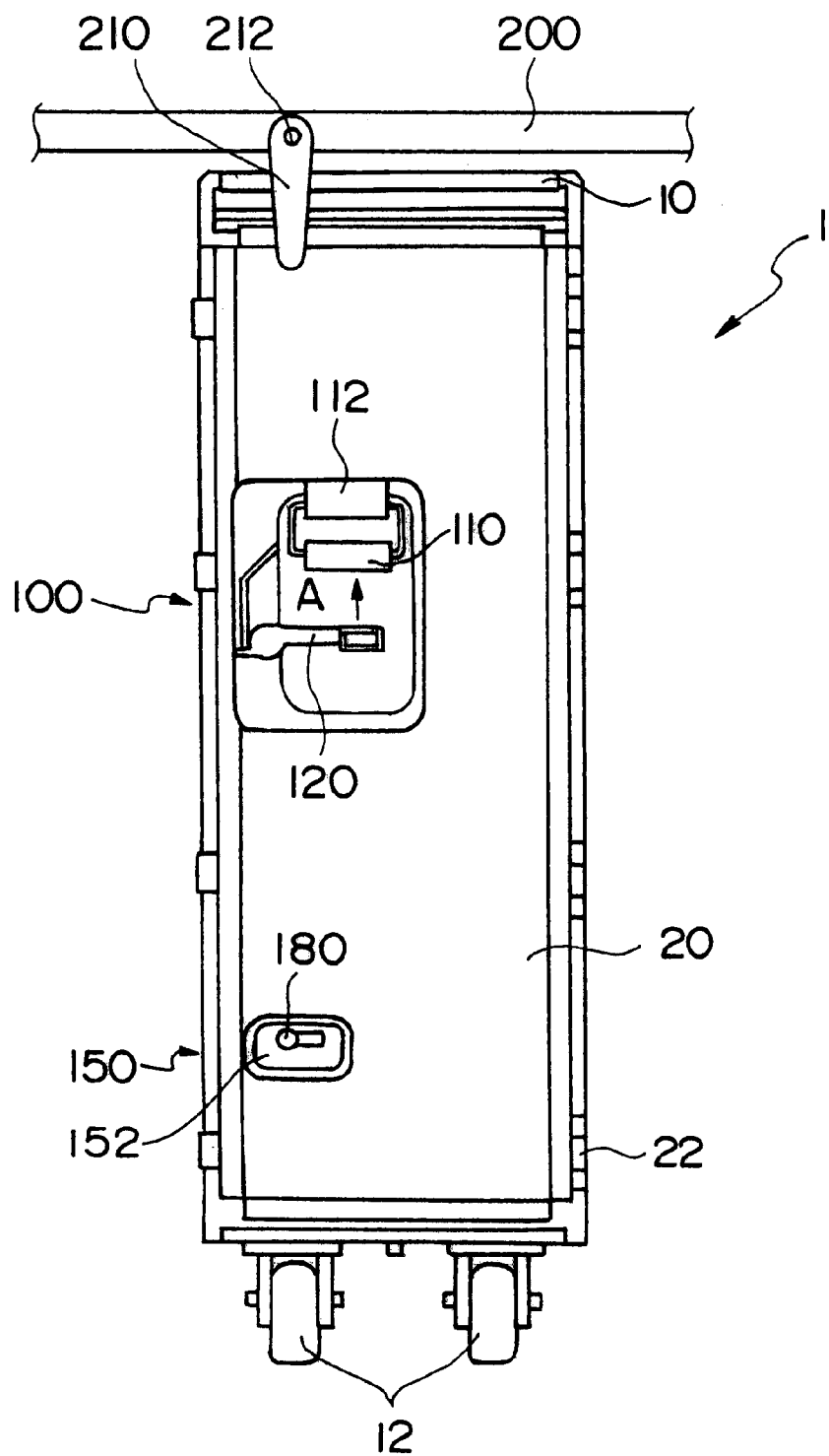
FIG. 2 is a front view of the door of the in-flight meal server equipped with the latch device according to the present invention.

FIG. 2 is a front view of a door of an in-flight meal server equipped with a latch device according to the present invention.

The drawing shows the state where an in-flight meal server 1 is stored inside a counter 200 of the galley, and held by a turn retainer 210. The turn retainer 210 is supported by a pin 212 so that it may rotate 90 degrees around the pin 212. When using the server 1, the flight attendant opens the turn retainer 210 and pulls the server 1 out.

The server 1 comprises a door 20, mounted by a hinge 22 to a box-shaped body 10 supported by a caster 12, which may be opened and closed.

A main latch device 100 is equipped to the central portion of the door 20. The main latch,device 100 has a handle 110 supported rotatably by a bearing 112. The handle 110 is connected to a lever 120 through a link mechanism, and by pulling the handle 110 toward the user, the lever 120 rotates to the arrow A direction.

Figure 6:
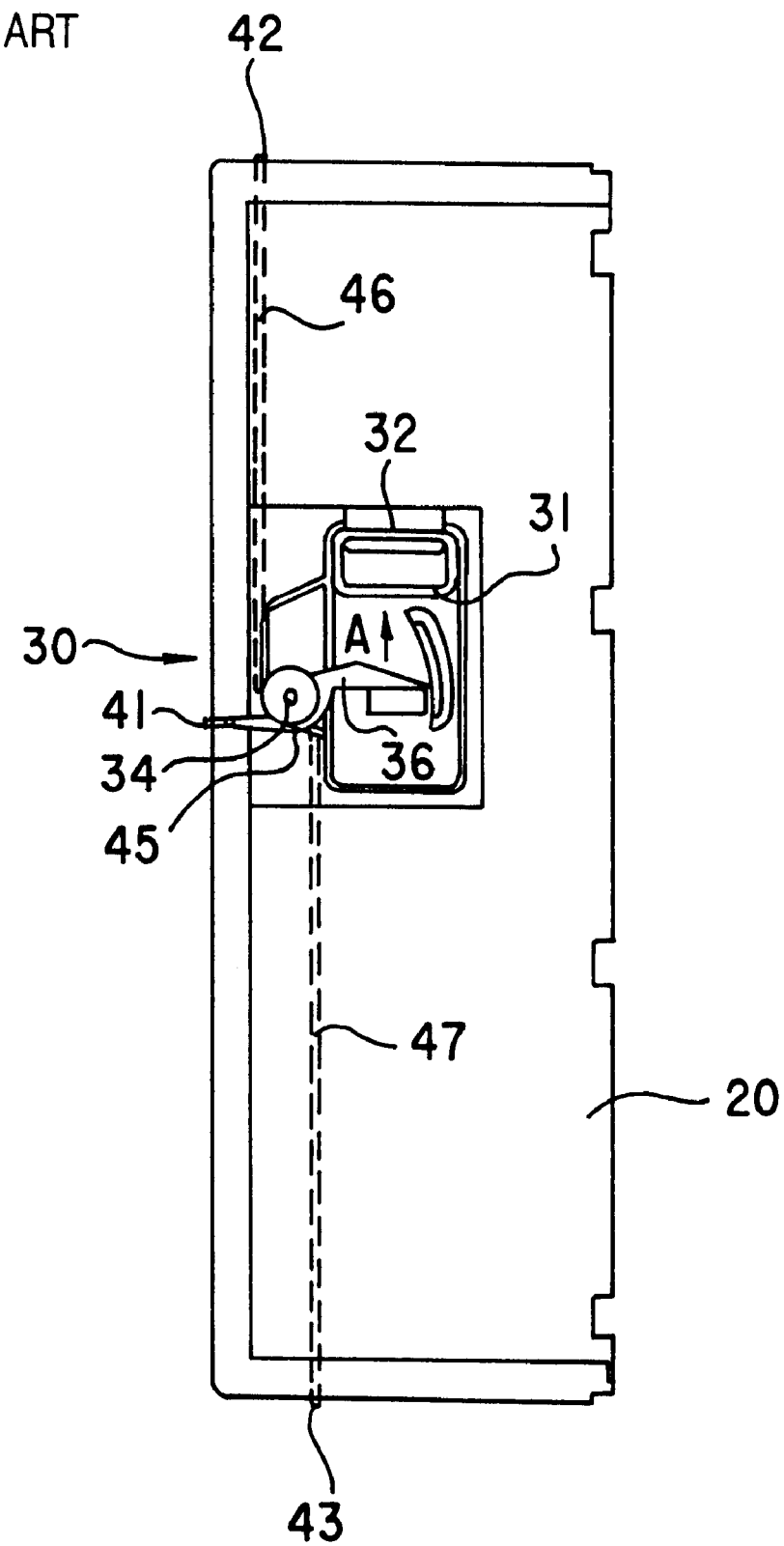
FIG. 6 is an explanatory view showing the prior art latch device.

The lever 120 is connected to a main bolt equipped on the side portion of the lever 120 through a link mechanism similar to the mechanism explained in FIG. 6. Usually, the main bolt is inserted to a catch formed on the body 10 side, and keeps the door 20 locked.

When the lever 120 rotates in the arrow A direction, the main bolt is pulled out from the catch, thereby unlocking the door, and enabling the door 20 to be opened.

An auxiliary latch device 150 provided to the lower portion of the door 20 comprises an operating portion 152 mounted on the surface of the door 20. The auxiliary latch device is equipped inside the operating portion 152.

Figure 3:
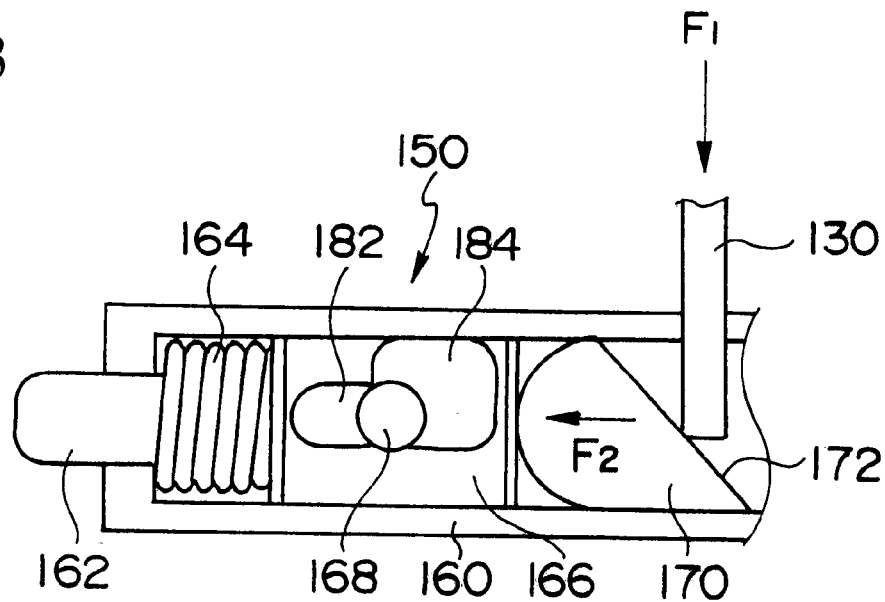
FIG. 3 is a cross-sectional view of the main portion of the auxiliary latch device.
Figure 4:
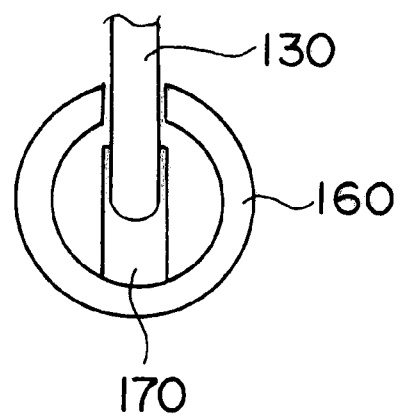
FIG. 4 is a right side view of FIG. 3.

FIG. 3 is a cross-sectional view showing the structure of an auxiliary latch device 150, and FIG. 4 is a right side view of FIG. 3.

The auxiliary latch device 150 has a cylinder-shaped body 160, and a slider 166 is slidably inserted to the body 160. An auxiliary bolt 162 is mounted to the slider 166, and a spring 164 positioned between the slider 166 and the body 160 provides bias force to the slider in the direction pulling the auxiliary bolt 162 inside the body 160 regularly.

A pin 168 for mounting an operational knob is provided to the slider 166. A red colored plate 182 is fixed to the auxiliary bolt 162 side of the pin 168, and a green colored plate 184 is fixed to the other side of the pin 168 opposite to the auxiliary bolt side.

A cam plate 170 is mounted to the slider 166 in the opposite side of the auxiliary bolt 162. The cam plate has an inclined cam surface 172.

The cylinder-shaped body 160 is fixed to the interior of the door 20, and by the auxiliary bolt 162 being inserted to or removed from the catch provided on the body 10 side of the server, locking or unlocking may be performed.

The tip of a rod 130 connected to the lever 120 of the main latch device penetrates through the cylinder-shaped body 160 and contacts the cam surface 172 of the cam plate 170.

In FIGS. 2 and 3, when the handle 110 of the main latch device 100 is operated toward the closing direction, and the lever 120 is rotated in the direction opposite to arrow A, the rod 130 moves in an arrow $F_1$ direction.

With the lowering of the rod 130, the cam plate 170 moves to an arrow $F_2$ direction, and the auxiliary bolt 162 is pushed out against the force of the spring 164, and inserted to the catch formed on the body side. By this operation, locking is accomplished.

When trouble occurs in the connecting mechanism of the lever 120 and the rod 130, and the auxiliary bolt 162 will not be pushed out, the auxiliary bolt 162 can be pushed out manually by moving the pin 168 in the arrow $F_2$ direction.

Figure 5:
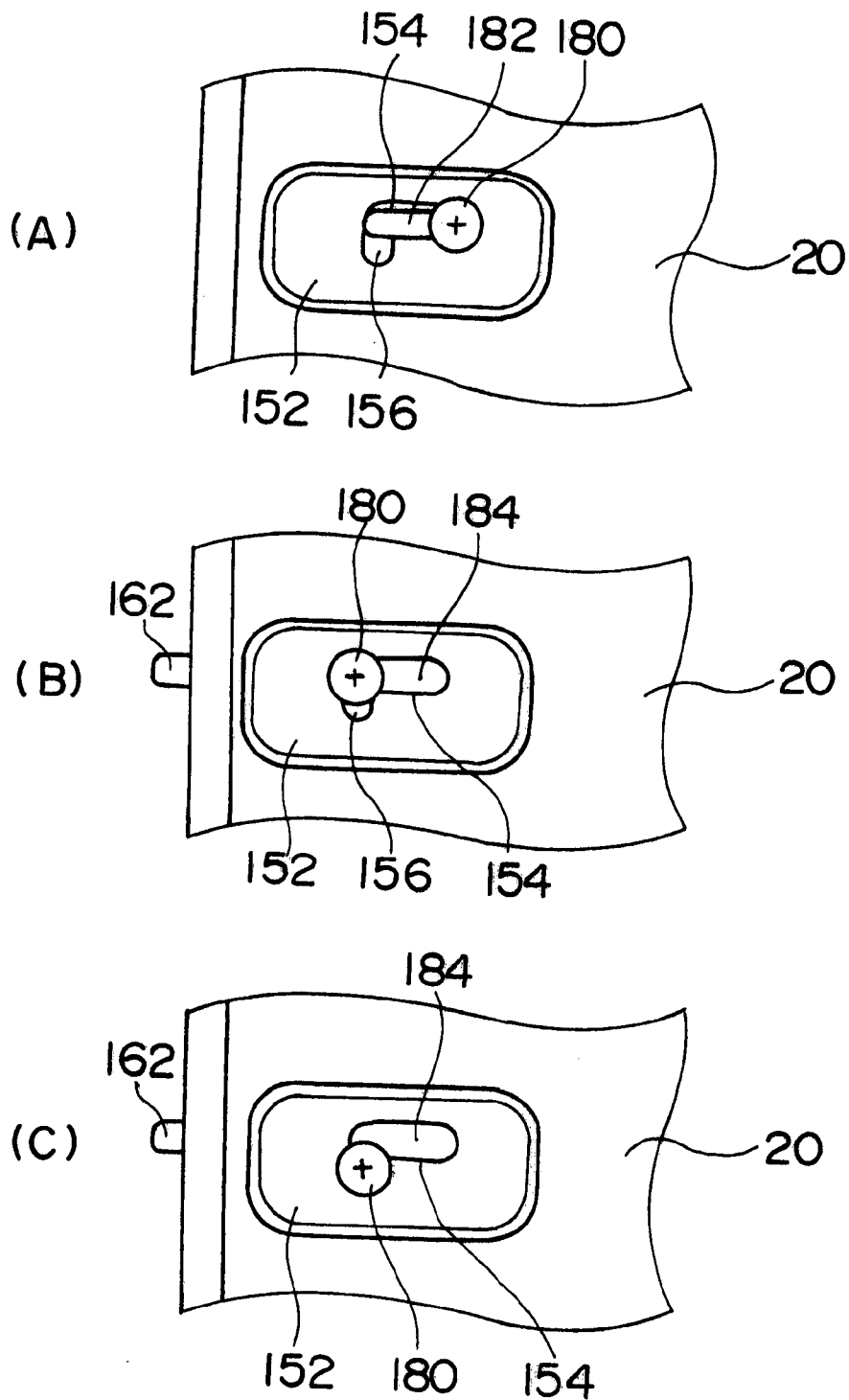
FIGS. 5a, 5b and 5c are explanatory views showing the operation of the auxiliary latch device.

FIGS. 5a, 5b and 5c are explanatory views of the operation of the auxiliary latch device.

An oblong guide groove 154 and a lock groove 156 formed vertically downward from the left end of the guide groove 154 ate formed on the operating portion 152.

The pin 168 of a knob 180 fits into the guide groove 154 and slides in the horizontal direction. FIG. 5(A) shows the state where the bolt of the auxiliary latch device is pulled in, so that the knob 180 is positioned on the right end of the guide groove 154, and a red colored indicator plate 182 formed on the left side of the knob 180 is indicated to the exterior. The user may observe that the auxiliary bolt is unlocked by checking the indicator.

When the handle of the main latch device is operated to the locking state, the knob 180 moves toward the left side through the link mechanism, and the auxiliary bolt 162 is protruded to the locking position, as seen in FIG. 5(B). In this state, a green colored indicator plate 184 formed on the right side of the knob 180 is indicated to the exterior, thereby showing that the auxiliary bolt has been locked.

When trouble occurs in the link mechanism connecting the main latch device and the auxiliary latch device, the auxiliary latch device will not operate even when the main latch device is operated, and maintains the state shown in FIG. 5(A), indicating the red colored indicator 182.

In this case, the user moves the knob 180 manually and pushes out the auxiliary bolt to the locking position, and places the knob 180 in the lock groove 156, as shown in FIG. 5(c), thereby completing the operation.

In the present embodiment, an example is shown where one auxiliary latch device is formed with the main latch device, and the link mechanism for operating the bolt formed on the upper portion of the door is the same as that of the prior art, but it is obvious that a manual auxiliary latch device may also be equipped to the operating mechanism of the bolt on the upper portion of the door.

Since the in-flight meal server is supported at the upper portion of the door by the turn retainer 210 fixed to the counter of the galley as seen in FIG. 2, when in the storage position inside the galley, it is important to confirm the locking condition of the bolt on the lower portion of the door.

The latch device of the door according to the present invention, as mentioned above, enables the necessary bolt to be moved manually to the locking position out of the plurality of bolts operated through the link mechanism by moving the handle. Therefore, even when a problem occurs to the link mechanism and the locking is not done, the locking may be performed manually, so the door may be sealed securely.

We claim:

1. A door latch device where locking and unlocking may be performed by inserting or separating a bolt equipped to a door against a catch formed on a corresponding portion, wherein said door latch device is equipped with a main latch device mounted near a handle for operating said main latch and an auxiliary latch device connected to said main latch device through a link mechanism, said auxiliary latch device being equipped with an operating portion formed on a front surface of said door, a cylinder-shaped main body fixed to the interior of said door, a bolt which is integrated with a slider, a spring for biasing said slider toward an unlocking direction, and a knob on the front surface of said door for manually operating said slider when said door is closed.

2. A door latch device according to claim 1, wherein said operating portion is equipped with a guide groove for guiding a pin, and a lock groove for maintaining said knob in a locking position.

3. A door latch device where locking and unlocking may be performed by inserting or separating a bolt equipped to a door against a catch formed on a corresponding portion, wherein said door latch device is equipped with a main latch device mounted near a handle for operating said main latch and an auxiliary latch device connected to said main latch device through a link mechanism, said auxiliary latch device being equipped with an operating portion formed on the surface of said door, a cylinder-shaped main body fixed to the interior of said door, a bolt which is integrated with a slider, a spring for biasing said slider toward an unlocking direction, and a knob for manually operating said slider, wherein said slider is equipped with a colored plate mounted on both sides of said pin, so that the locked or unlocked state may be shown to the exterior through a guide groove.

* * * * *